(12) United States Patent
Kim

(10) Patent No.: US 10,196,083 B2
(45) Date of Patent: Feb. 5, 2019

(54) BEARING ASSEMBLY OF STEERING APPARATUS AND STEERING APPARATUS HAVING THE SAME

(71) Applicant: MANDO CORPORATION, Gyeonggi-do (KR)

(72) Inventor: Dong Sik Kim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 138 days.

(21) Appl. No.: 15/478,128

(22) Filed: Apr. 3, 2017

(65) Prior Publication Data

US 2017/0291634 A1 Oct. 12, 2017

(30) Foreign Application Priority Data

Apr. 6, 2016 (KR) .................. 10-2016-0042524

(51) Int. Cl.
| | | |
|---|---|---|
| B62D 5/04 | (2006.01) | |
| F16C 19/06 | (2006.01) | |
| F16H 25/22 | (2006.01) | |
| F16H 35/18 | (2006.01) | |
| F16C 27/04 | (2006.01) | |
| F16C 25/08 | (2006.01) | |

(52) U.S. Cl.
CPC ............ *B62D 5/0448* (2013.01); *F16C 19/06* (2013.01); *F16C 27/04* (2013.01); *F16H 25/2204* (2013.01); *F16H 35/18* (2013.01); *F16C 25/083* (2013.01); *F16C 2326/24* (2013.01)

(58) Field of Classification Search
CPC ..... B62D 5/0445; B62D 5/0448; F16C 19/04; F16C 19/06; F16C 19/08
See application file for complete search history.

(56) References Cited

U.S. PATENT DOCUMENTS

| 4,144,957 A * | 3/1979 | de Gennes ............... F16C 25/08 |
| | | 192/110 B |
| 7,217,039 B2 * | 5/2007 | Baudelocque ............ C12N 9/93 |
| | | 310/90.5 |
| 2017/0217474 A1* | 8/2017 | Iwakawa ................. F16C 35/07 |

FOREIGN PATENT DOCUMENTS

| CN | 103085857 | 5/2013 |
| CN | 204784230 U | 11/2015 |
| DE | 10 2012 222 802 | 6/2014 |
| JP | 2009-287658 | 12/2009 |
| KR | 10-2006-0101622 | 9/2006 |

OTHER PUBLICATIONS

Office Action dated Oct. 8, 2018 for Chinese Patent Application No. 201710220837.0 and its English translation by Google Translate.

* cited by examiner

*Primary Examiner* — Kevin Hurley
(74) *Attorney, Agent, or Firm* — Ladas & Parry, LLP

(57) ABSTRACT

Disclosed herein is a bearing assembly for a vehicle steering apparatus, which includes a bearing including an inner ring fastened to a rack bar, an outer ring disposed outside the inner ring with a ball interposed therebetween, and a sealing member provided between the inner ring and the outer ring, and an elastic clip including a body pressed against an outer peripheral surface of the outer ring, fastening portions bent toward sides of the outer ring from both ends of the body, and elastic portions extending from respective ends of the fastening portions and protruding laterally of the outer ring to each have a curvature.

17 Claims, 6 Drawing Sheets

[Fig. 1]
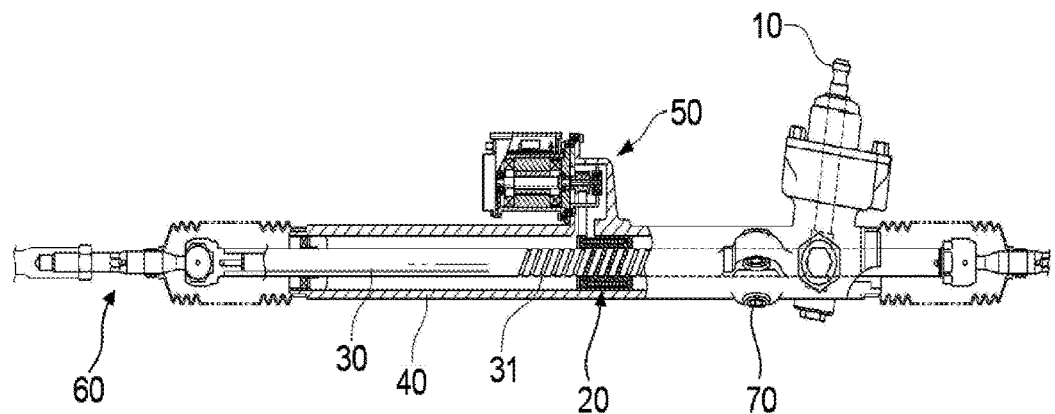
[Fig. 2]
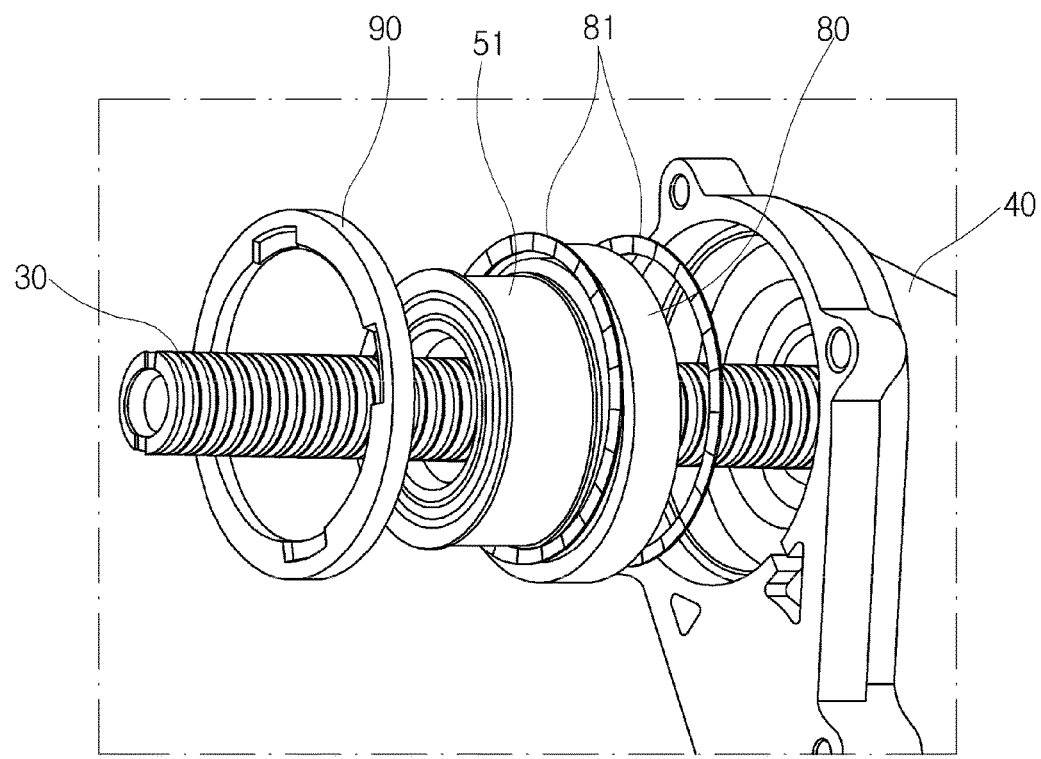

[Fig. 3]
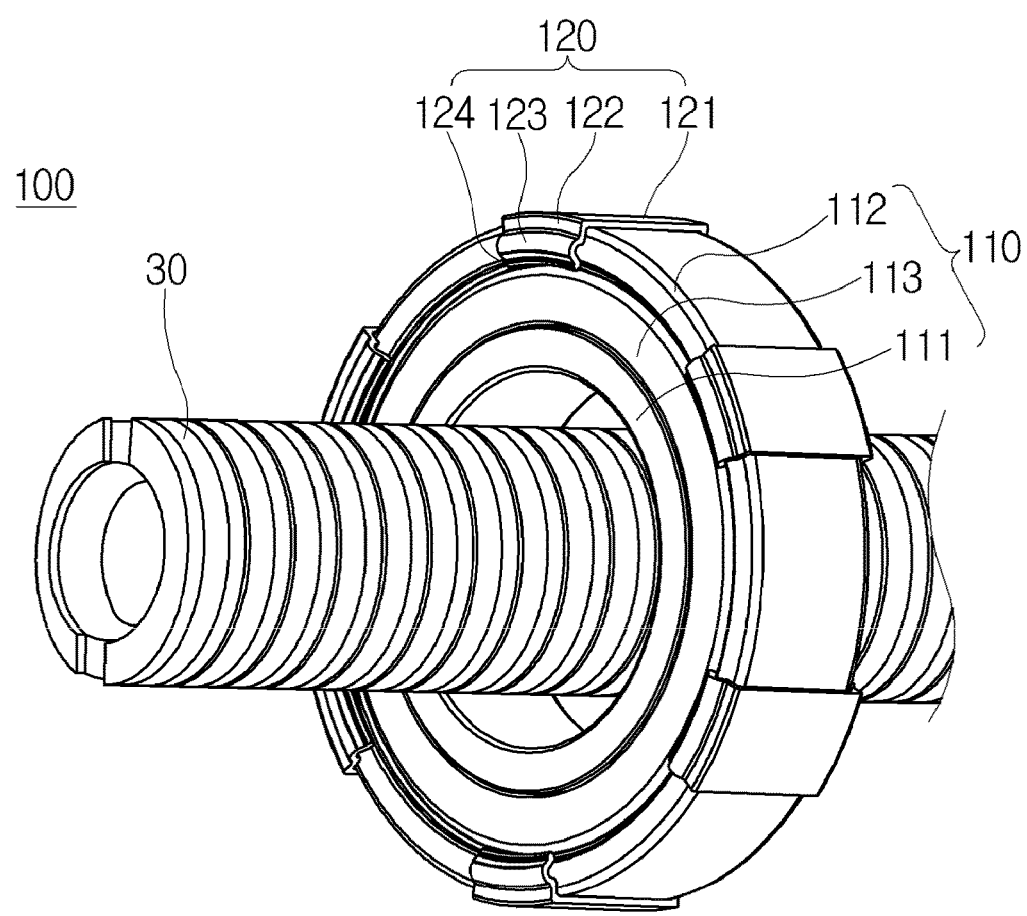

[Fig. 4]
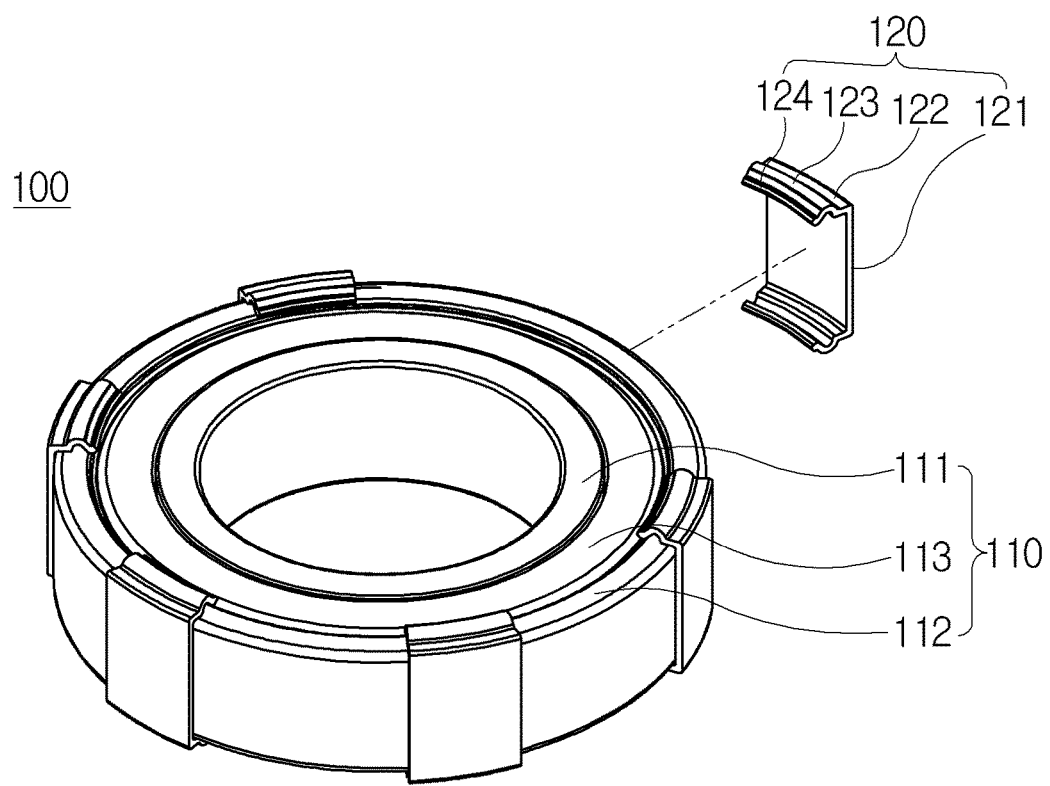

[Fig. 5]
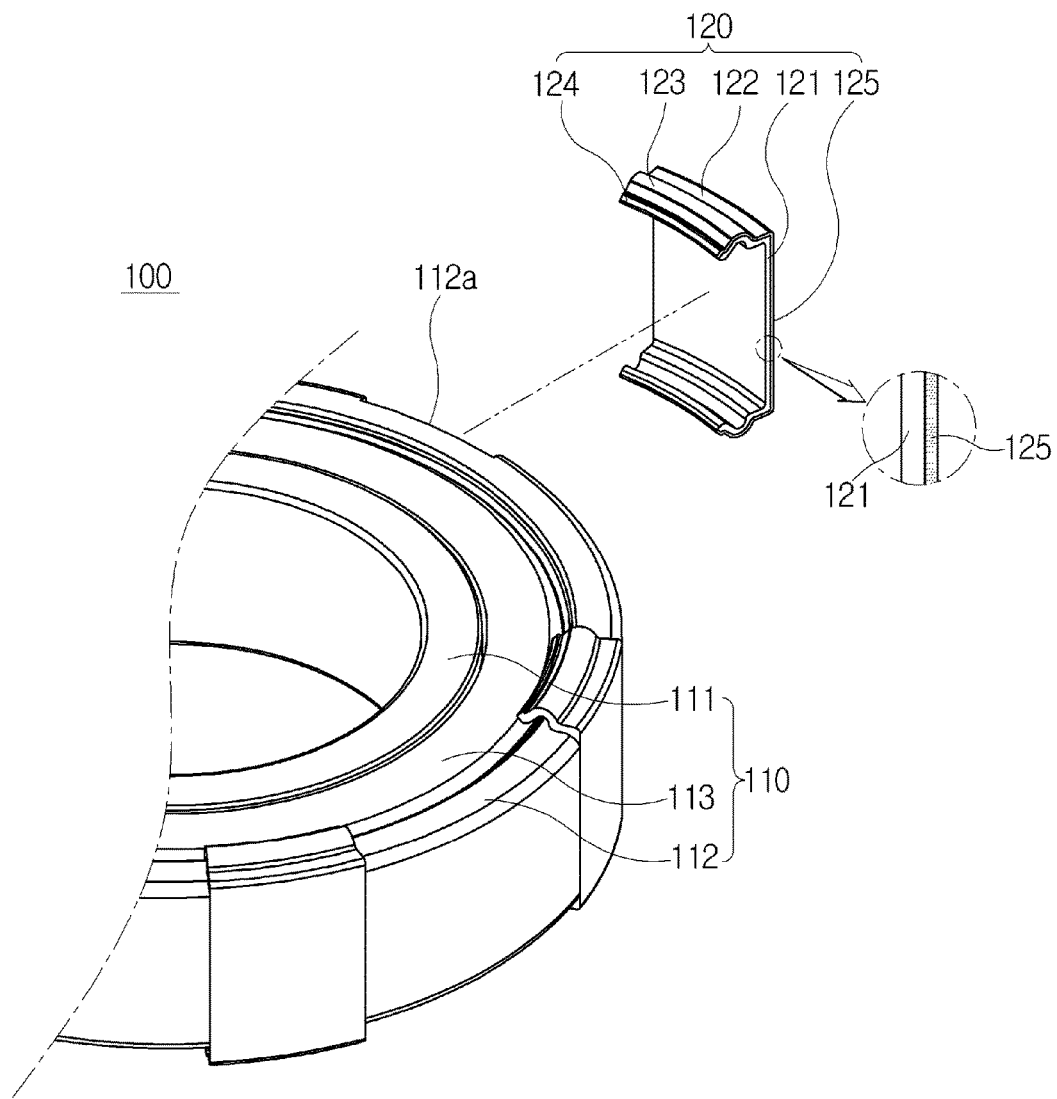

[Fig. 6]
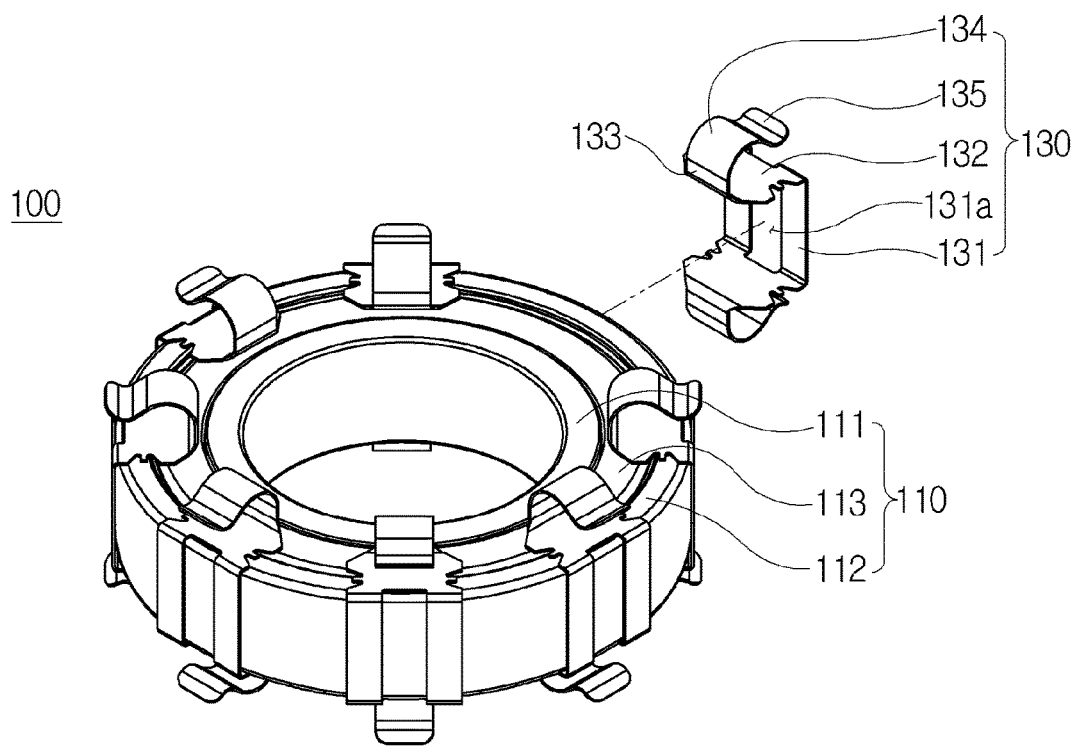

[Fig. 7]
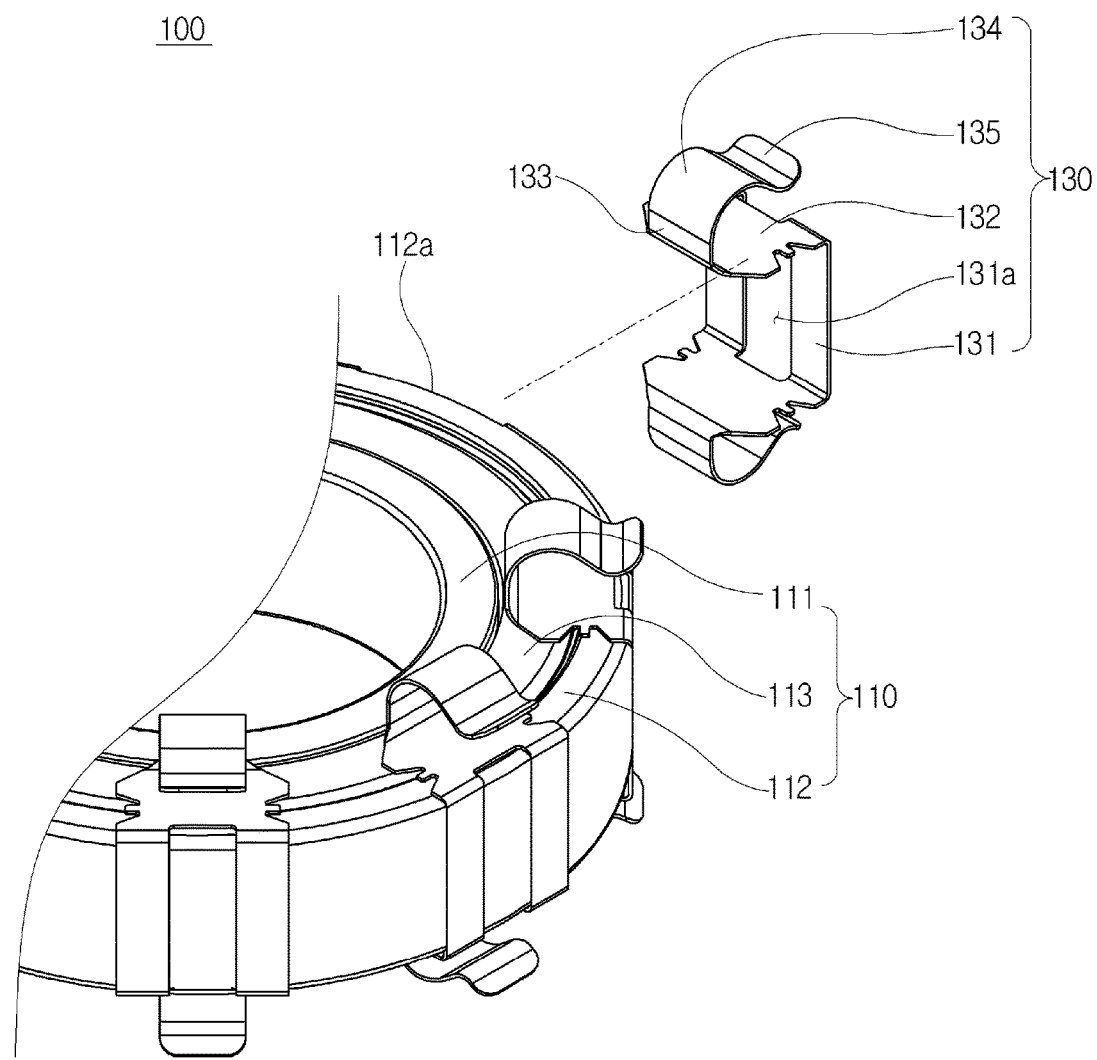

BEARING ASSEMBLY OF STEERING APPARATUS AND STEERING APPARATUS HAVING THE SAME

CROSS-REFERENCE TO RELATED APPLICATIONS

This application claims priority to Korean Patent Application No. 10-2016-0042524, filed on Apr. 6, 2016, the disclosure of which is incorporated herein by reference in its entirety.

BACKGROUND OF THE INVENTION

Field of the Invention

Exemplary embodiments of the present invention relate to a vehicle steering apparatus, and more particularly, to a bearing assembly provided in a vehicle steering apparatus.

Description of the Related Art

In recent years, electric power steering apparatuses using motors have been gradually generalized from hydraulic power steering apparatuses using hydraulic pressure of hydraulic pumps, as power-assisted steering apparatuses for vehicles.

Such a typical electric power steering apparatus includes a steering device that connects from a steering wheel to both wheels, and auxiliary power device that supplies steering assist power to the steering device.

The auxiliary power device includes a torque sensor that detects a steering torque applied to a steering wheel by a driver and outputs an electrical signal proportional to the detected steering torque, an ECU (Electronic Control Unit) that generates a control signal in response to the electrical signal transmitted from the torque sensor, a motor that generates steering assist power in response to the control signal transmitted from the ECU, and a belt gearing that transmits the steering assist power generated by the motor to a rack bar through a belt.

FIG. 1 is a perspective view illustrating a conventional vehicle steering apparatus. FIG. 2 is a perspective view illustrating an interior of a rack housing of the conventional vehicle steering apparatus.

Referring to FIG. 1, the conventional vehicle steering apparatus includes a pinion shaft 10 that is connected to a steering wheel (not shown) to rotate along with the rotation of the steering wheel, a ball screw type rack bar 30 that is rectilinearly moved by the rotational force of the pinion shaft 10, and a drive unit 50 that provides auxiliary power for the rectilinear motion of the rack bar 30.

The rack bar 30 is rotatably accommodated in a rack housing 40, and link units 60 are respectively connected to both sides of the rack bar 30. The rack housing 40 may be provided with a mounting bracket 70 that fixes the racking housing to a vehicle body.

Referring to FIG. 2, the drive unit 50 includes an electric motor that is controlled by an ECU, a driving pulley that is fixed to the shaft of the electric motor, and an interlocking pulley 51 that is coupled to the outer side of the rack bar so as to rotatably interlock with the driving pulley.

The driving pulley and the interlocking pulley are axially disposed in parallel to each other. When electric power is applied to the electric motor, the rotational force of the electric motor is transmitted to the rack bar 30 so that the rack bar 30 having a rack gear 31 slides in the left and right directions by the operation of a ball nut 20, thereby obtaining auxiliary power required for steering.

The ball nut 20 is a hollow tube that is coupled to the outer peripheral surface of the rack bar 30, and has stepped jaws formed at both sides on the outer peripheral surface thereof. The interlocking pulley 51 is installed to one axial side of the ball nut 20 so as to be pressed against the associated one of the stepped jaws, and a lock nut (not shown), which is fixedly coupled to the ball nut 20, is installed to one side of the interlocking pulley 51 so as to fix the interlocking pulley 51 to the rack bar 30.

A bearing 80 is installed to the other axial side of the ball nut 20 so as to be pressed against the associated one of the stepped jaws, and the bearing 80 is fixed by a lock nut coupled to the other end of the ball nut 20.

In this case, wave washers 81 are coupled to both sides of the bearing 80 to axially and elastically support the bearing 80. The conventional assembly of the wave washers 81 to the bearing 80 takes a relatively long time, and it is necessary to manufacture new wave washers in order to increase the elastic force of the wave washers 81 coupled to the bearing 80. Hence, the time for manufacturing and assembling the bearing may be increased.

PRIOR ART DOCUMENT

[Patent Document]
(Patent Document 1) Korean Patent Application Publication No. 10-2006-0101622

SUMMARY OF THE INVENTION

An object of the present invention is to provide a bearing assembly for a vehicle steering apparatus, which is capable of easily adjusting an elastic force to elastically support a bearing.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a bearing assembly for a vehicle steering apparatus includes a bearing including an inner ring fastened to an outer side of a ball nut, an outer ring disposed outside the inner ring with a ball interposed therebetween, and a sealing member provided between the inner ring and the outer ring, and an elastic clip including a body pressed against an outer peripheral surface of the outer ring, fastening portions bent toward sides of the outer ring from both ends of the body, and elastic portions extending from respective ends of the fastening portions and protruding laterally of the outer ring to each have a curvature.

The body may have a curvature corresponding to a curvature of the outer ring so as to be pressed against the outer peripheral surface of the outer ring.

In addition, spaces may be defined between the respective elastic portions and the respective sides of the outer ring.

Each of the elastic portions may have a substantially "C"-shaped cross-section.

The elastic clip may further include support portions extending from respective ends of the elastic portions, the support portions being seated on a boundary between the outer ring and the sealing member.

The outer ring may have a seating groove formed on the outer peripheral surface thereof such that the elastic clip is seated on the seating groove.

The elastic clip may further include an elastic reinforcement member formed on an outer side thereof.

In accordance with another aspect of the present invention, a bearing assembly for a vehicle steering apparatus includes a bearing including an inner ring fastened to an outer side of the ball nut, an outer ring disposed outside the inner ring with a ball interposed therebetween, and a sealing member provided between the inner ring and the outer ring, and an elastic clips including a body pressed against an outer peripheral surface of the outer ring, first bent portions bent from both ends of the body to a boundary between the outer ring and the sealing member, second bent portions bent laterally of the outer ring from respective ends of the first bent portions, and elastic portions extending from the respective second bent portions and protruding laterally of the outer ring to each have a curvature.

The body may have a curvature corresponding to a curvature of the outer ring so as to be pressed against the outer peripheral surface of the outer ring.

The body may have an opening portion formed in a width direction of the outer ring.

In addition, spaces may be defined between the respective first bent portions and the respective elastic portions.

Each of the elastic portions may have a substantially "C"-shaped cross-section.

The elastic clip may further include edge portions extending from respective ends of the elastic portions and protruding outwardly of the bearing to each have a curvature.

The outer ring may have a seating groove formed on the outer peripheral surface thereof such that the elastic clip is seated on the seating groove.

In accordance with a further aspect of the present invention, a vehicle steering apparatus includes a steering wheel, a pinion shaft connected to the steering wheel to rotate along with rotation of the steering wheel, a rack bar rectilinearly moved by rotational force of the pinion shaft, a ball nut coupled to an outer side of the rack bar, a drive unit to provide auxiliary power for rectilinear motion of the rack bar, a bearing including an inner ring fastened to an outer side of the ball nut, an outer ring disposed outside the inner ring with a ball interposed therebetween, and a sealing member provided between the inner ring and the outer ring, and an elastic clip coupled to an outer side of the bearing.

The elastic clip may include a body pressed against an outer peripheral surface of the outer ring, fastening portions bent toward sides of the outer ring from both ends of the body, and elastic portions extending from respective ends of the fastening portions and protruding laterally of the outer ring to each have a curvature.

Alternatively, the elastic clip may include a body pressed against an outer peripheral surface of the outer ring, first bent portions bent from both ends of the body to a boundary between the outer ring and the sealing member, second bent portions bent laterally of the outer ring from respective ends of the first bent portions, and elastic portions extending from the respective second bent portions and protruding laterally of the outer ring to each have a curvature.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a conventional vehicle steering apparatus;

FIG. 2 is a perspective view illustrating an interior of a rack housing of the conventional vehicle steering apparatus;

FIG. 3 is a perspective view illustrating a bearing assembly for a vehicle steering apparatus according to a first embodiment of the present invention, which is coupled to a rack bar of a vehicle steering apparatus;

FIG. 4 is an exploded perspective view illustrating the bearing assembly for a vehicle steering apparatus according to the first embodiment of the present invention;

FIG. 5 is an exploded perspective view illustrating a bearing assembly for a vehicle steering apparatus according to a second embodiment of the present invention;

FIG. 6 is an exploded perspective view illustrating a bearing assembly for a vehicle steering apparatus according to a third embodiment of the present invention; and FIG. 7 is an exploded perspective view illustrating a bearing assembly for a vehicle steering apparatus according to a fourth embodiment of the present invention.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In the whole description, it will be understood that when an element is referred to as being "connected" to another element, it can be "directly connected" to the other element or it can be "electrically connected" to the other element with other elements being interposed therebetween. In addition, it will be understood that when a component is referred to as being "comprising" any component, it does not exclude other components, but can further comprises the other components unless otherwise specified.

Hereinafter, the exemplary embodiments of the present invention will be described in detail with reference to the accompanying drawings.

A vehicle steering apparatus to which a bearing assembly according to exemplary embodiments of the present invention is applied includes a steering wheel, a pinion shaft that is connected to the steering wheel to rotate along with the rotation of the steering wheel, a rack bar that is rectilinearly moved by the rotational force of the pinion shaft, a ball nut that is coupled to the outer side of the rack bar, and a drive unit that provides auxiliary power for the rectilinear motion of the rack bar. Since these components are similar to those of the conventional steering apparatus illustrated in FIGS. 1 and 2, a detailed description thereof will be omitted.

FIG. 3 is a perspective view illustrating a bearing assembly for a vehicle steering apparatus according to a first embodiment of the present invention. FIG. 4 is an exploded perspective view illustrating the bearing assembly for a vehicle steering apparatus according to the first embodiment of the present invention.

Referring to FIGS. 3 and 4, the bearing assembly, which is designated by reference numeral 100, according to the first embodiment includes a bearing 110 that supports the rotation of a ball nut 20 (see FIG. 1), and an elastic clip 120 that is coupled to the bearing 110.

The bearing 110 is fastened to the outer side of the ball nut 20 coupled to the outer peripheral surface of a rack bar 30, and includes an inner ring 111 that is coupled to the outer side of the ball nut, an outer ring 112 that is disposed outside the inner ring 111 at a distance therefrom, a ball (not shown) that is interposed between the inner ring 111 and the outer ring 112, and a sealing member 113 that is provided between the inner ring 111 and the outer ring 112 to prevent the separation of the ball and the introduction of foreign substances.

The outer ring 112 may have a larger width than the sealing member 113 such that the elastic clip 120 may be stably fastened to the outer ring 112.

The sealing member 113 may be made of a material, which is able to sufficiently seal a gap between the inner ring 111 and the outer ring 112, for example of rubber, and may be formed between the inner ring 111 and the outer ring 112 by insert injection molding.

The elastic clip 120 may consist of a plurality of elastic clips coupled to the outer side of the outer ring 112, and the plurality of elastic clips 120 may be arranged at regular intervals or at irregular intervals. Each of the elastic clips 120 includes a body 121, fastening portions 122 that are bent from the ends of the body 121, elastic portions 123 that extend from the respective ends of the fastening portions 122, and support portions 124 that extend from the respective ends of the elastic portions 123. The fastening portions 122, the elastic portions 123, and the support portions 124 may be symmetrically formed at both sides of the body 121.

Although the body 121 has a substantially flat shape, it may have a curvature corresponding to the curvature of the outer ring 112 so as to be pressed against the outer peripheral surface of the outer ring 112.

The fastening portions 122 are bent toward the sides of the outer ring 112 from the ends of the body 121 so that the elastic clip 120 is fastened to the bearing. Each of the fastening portions 122 may extend to a portion of the associated side of the outer ring 112.

The elastic portions 123 may extend from the ends of the fastening portions 122, and may protrude laterally of the bearing 110 to have a substantially "C"-shaped cross-section. Accordingly, a space is defined between the outer ring 112 and each of the elastic portions 123, and the elastic portions 123 may sufficiently provide an elastic force in the axial direction of the rack bar in a state in which they are stably supported by the outer ring 112.

The support portions 124 may extend from the ends of the elastic portions 123 to be seated on the boundary between the outer ring 122 and the sealing member 123. In this case, since the width of the outer ring 112 is larger than the width of the sealing member 113, the support portions 124 may be securely fastened to the outer ring 122.

The bearing assembly having the above configuration may be modularized by simply fastening the elastic clips 120 to the bearing 110. Therefore, the total assembly time of the vehicle steering apparatus can be reduced. In addition, the number of elastic clips fastened to the outer side of the bearing 110 may be increased or decreased, and the arrangement of the elastic clips may be freely adjusted. Therefore, it is possible to easily adjust the overall strength of the bearing assembly.

FIG. 5 is an exploded perspective view illustrating a bearing assembly for a vehicle steering apparatus according to a second embodiment of the present invention.

When the elastic clip 120 is fastened to the outer ring 112 of the bearing 110, the elastic clip 120 protrudes radially of the outer ring 122 by a predetermined amount, in which case a gap is formed between the inner surface of the rack housing and the outer ring 112.

Referring to FIG. 5, an outer ring 112 of a bearing 110 according to the second embodiment has seating grooves 112a formed on the outer peripheral surface thereof such that elastic clips 120 are seated on the seating grooves 112a. Bodies 121 of the elastic clips 120 are seated on and coupled to the seating grooves 112a, and thus the elastic clips 120 do not protrude radially of the bearing 110. That is, there is no stepped portion between the elastic clips 120 and the outer ring 112. Thus, when the bearing 110 is installed in the rack housing, the outer ring 112 and the elastic clips 120 may be pressed against the inner surface of the rack housing with no gap therebetween.

Moreover, each of the elastic clips 120 further includes an elastic reinforcement member 125 that is formed on the outer side thereof and is made of rubber or the like, thereby increasing an elastic force. The elastic reinforcement member 125 may be formed integrally with the elastic clip 120 by insert injection molding or the like. The elastic reinforcement member 125 may be formed on the entire outer side of the elastic clip 120 or on a portion of the outer side of the elastic clip 120.

FIG. 6 is an exploded perspective view illustrating a bearing assembly for a vehicle steering apparatus according to a third embodiment of the present invention.

Referring to FIG. 6, the bearing assembly according to the third embodiment includes a bearing 110 that is coupled to a ball nut, and an elastic clip 130 that is coupled to the bearing 110.

The bearing 110 includes an inner ring 111 that is coupled to the outer side of the ball nut, an outer ring 112 that is disposed outside the inner ring 111 at a distance therefrom, a ball that is provided between the inner ring 111 and the outer ring 112, and a sealing member 113 that is provided between the inner ring 111 and the outer ring 112 to prevent the separation of the ball and the introduction of foreign substances.

The elastic clip 130 may consist of a plurality of elastic clips coupled to the outer side of the outer ring 112, and the plurality of elastic clips 130 may be arranged at regular intervals or at irregular intervals. Each of the elastic clips 130 includes a body 131, first bent portions 132 that are bent from the ends of the body 131, second bent portions 133 that extend from the respective ends of the first bent portions 132, and elastic portions 134 that extend toward the bearing 110 from the respective ends of the second bent portions 133. The first bent portions 132, the second bent portions 133, and the elastic portions 134 may be symmetrically formed at both sides of the body 131.

The body 131 has a curvature corresponding to the curvature of the outer ring 112 so as to be pressed against the outer peripheral surface of the outer ring 112, and may have an opening portion 131a that is formed at the center thereof in the width direction of the outer ring 112, to reduce the overall weight thereof.

The first bent portion 132 each have a substantially flat shape, and are bent toward the sides of the outer ring 112 from the ends of the body 131 to extend to the boundary between the outer ring 112 and the sealing member 113. Therefore, it is possible to further increase the fastening force between the bearing 110 and the elastic clip 130, compared to the first embodiment.

The second bent portions 133 may be bent outwardly of the bearing 110 from the ends of the first bent portions 132, and may be perpendicular to the first bent portions 132 such that the elastic portions 134 have a sufficient elastic force.

The elastic portions 134 may extend laterally of the bearing 110 from the ends of the second bent portions 133 to each have a predetermined curvature, and may have a substantially "C"-shaped cross-section. Accordingly, the elastic portions 134 protrude outwardly of the outer ring 112 so that spaces are defined between the respective elastic portions 134 and the respective first bent portions 132, thereby sufficiently providing an axial elastic force.

In addition, the elastic clip 130 according to the second embodiment further includes edge portions 135 that extend from the respective ends of the elastic portions 134 and are bent outwardly of the bearing 110 to each have a predetermined curvature. Thus, it is possible to further increase an axial elastic force.

FIG. 7 is an exploded perspective view illustrating a bearing assembly for a vehicle steering apparatus according to a fourth embodiment of the present invention.

Referring to FIG. 7, an outer ring 112 of a bearing 110 according to the fourth embodiment has seating grooves 112a formed on the outer peripheral surface thereof such that elastic clips 130 are seated on the seating grooves 112a. Bodies 131 of the elastic clips 130 are seated on and coupled to the seating grooves 112a, and thus there is no stepped portion between the elastic clips 130 and the outer ring 112. Thus, when the bearing 110 is installed in the rack housing, the outer ring 112 and the elastic clips 130 may be pressed against the inner surface of the rack housing with no gap therebetween.

As is apparent from the above description, according to exemplary embodiments of the present invention, a bearing assembly can be modularized by simply fastening elastic clips to a bearing. Therefore, the total assembly process of a vehicle steering apparatus can be simplified. In addition, the number of elastic clips fastened to the outer side of the bearing can be easily increased or decreased, and therefore it is possible to easily adjust the overall strength of the bearing assembly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A bearing assembly for a vehicle steering apparatus, the bearing assembly being fastened to an outer side of a ball nut coupled to an outer peripheral surface of a rack bar, the bearing assembly comprising:
   a bearing comprising an inner ring fastened to the outer side of the ball nut, an outer ring disposed outside the inner ring with a ball interposed therebetween, and a sealing member provided between the inner ring and the outer ring; and
   an elastic clip comprising a body pressed against an outer peripheral surface of the outer ring, fastening portions bent toward sides of the outer ring from both ends of the body, and elastic portions extending from respective ends of the fastening portions and protruding laterally of the outer ring to each have a curvature.

2. The bearing assembly according to claim 1, wherein the body has a curvature corresponding to a curvature of the outer ring so as to be pressed against the outer peripheral surface of the outer ring.

3. The bearing assembly according to claim 1, wherein spaces are defined between the respective elastic portions and the respective sides of the outer ring.

4. The bearing assembly according to claim 1, wherein each of the elastic portions has a substantially "C"-shaped cross-section.

5. The bearing assembly according to claim 1, wherein the elastic clip further comprises support portions extending from respective ends of the elastic portions, the support portions being seated on a boundary between the outer ring and the sealing member.

6. The bearing assembly according to claim 1, wherein the outer ring has a seating groove formed on the outer peripheral surface thereof such that the elastic clip is seated on the seating groove.

7. The bearing assembly according to claim 1, wherein the elastic clip further comprises an elastic reinforcement member formed on an outer side thereof.

8. A bearing assembly for a vehicle steering apparatus, the bearing assembly being fastened to an outer side of a ball nut coupled to an outer peripheral surface of a rack bar, the bearing assembly comprising:
   a bearing comprising an inner ring fastened to the outer side of the ball nut, an outer ring disposed outside the inner ring with a ball interposed therebetween, and a sealing member provided between the inner ring and the outer ring; and
   an elastic clip comprising a body pressed against an outer peripheral surface of the outer ring, first bent portions bent from both ends of the body to a boundary between the outer ring and the sealing member, second bent portions bent laterally of the outer ring from respective ends of the first bent portions, and elastic portions extending from the respective second bent portions and protruding laterally of the outer ring to each have a curvature.

9. The bearing assembly according to claim 8, wherein the body has a curvature corresponding to a curvature of the outer ring so as to be pressed against the outer peripheral surface of the outer ring.

10. The bearing assembly according to claim 8, wherein the body has an opening portion formed in a width direction of the outer ring.

11. The bearing assembly according to claim 8, wherein spaces are defined between the respective first bent portions and the respective elastic portions.

12. The bearing assembly according to claim 8, wherein each of the elastic portions has a substantially "C"-shaped cross-section.

13. The bearing assembly according to claim 8, wherein the elastic clip further comprises edge portions extending from respective ends of the elastic portions and protruding outwardly of the bearing to each have a curvature.

14. The bearing assembly according to claim 8, wherein the outer ring has a seating groove formed on the outer peripheral surface thereof such that the elastic clip is seated on the seating groove.

15. A vehicle steering apparatus comprising:
   a steering wheel;
   a pinion shaft connected to the steering wheel to rotate along with rotation of the steering wheel;
   a rack bar rectilinearly moved by rotational force of the pinion shaft;
   a ball nut coupled to an outer side of the rack bar;
   a drive unit to provide auxiliary power for rectilinear motion of the rack bar;
   a bearing comprising an inner ring fastened to an outer side of the ball nut, an outer ring disposed outside the inner ring with a ball interposed therebetween, and a sealing member provided between the inner ring and the outer ring; and
   an elastic clip coupled to an outer side of the bearing.

16. The vehicle steering apparatus according to claim 15, wherein the elastic clip comprises:
   a body pressed against an outer peripheral surface of the outer ring;
   fastening portions bent toward sides of the outer ring from both ends of the body; and
   elastic portions extending from respective ends of the fastening portions and protruding laterally of the outer ring to each have a curvature.

17. The vehicle steering apparatus according to claim 15, wherein the elastic clip comprises:
   a body pressed against an outer peripheral surface of the outer ring;
   first bent portions bent from both ends of the body to a boundary between the outer ring and the sealing member;
   second bent portions bent laterally of the outer ring from respective ends of the first bent portions; and
   elastic portions extending from the respective second bent portions and protruding laterally of the outer ring to each have a curvature.

* * * * *